Patented Nov. 6, 1934

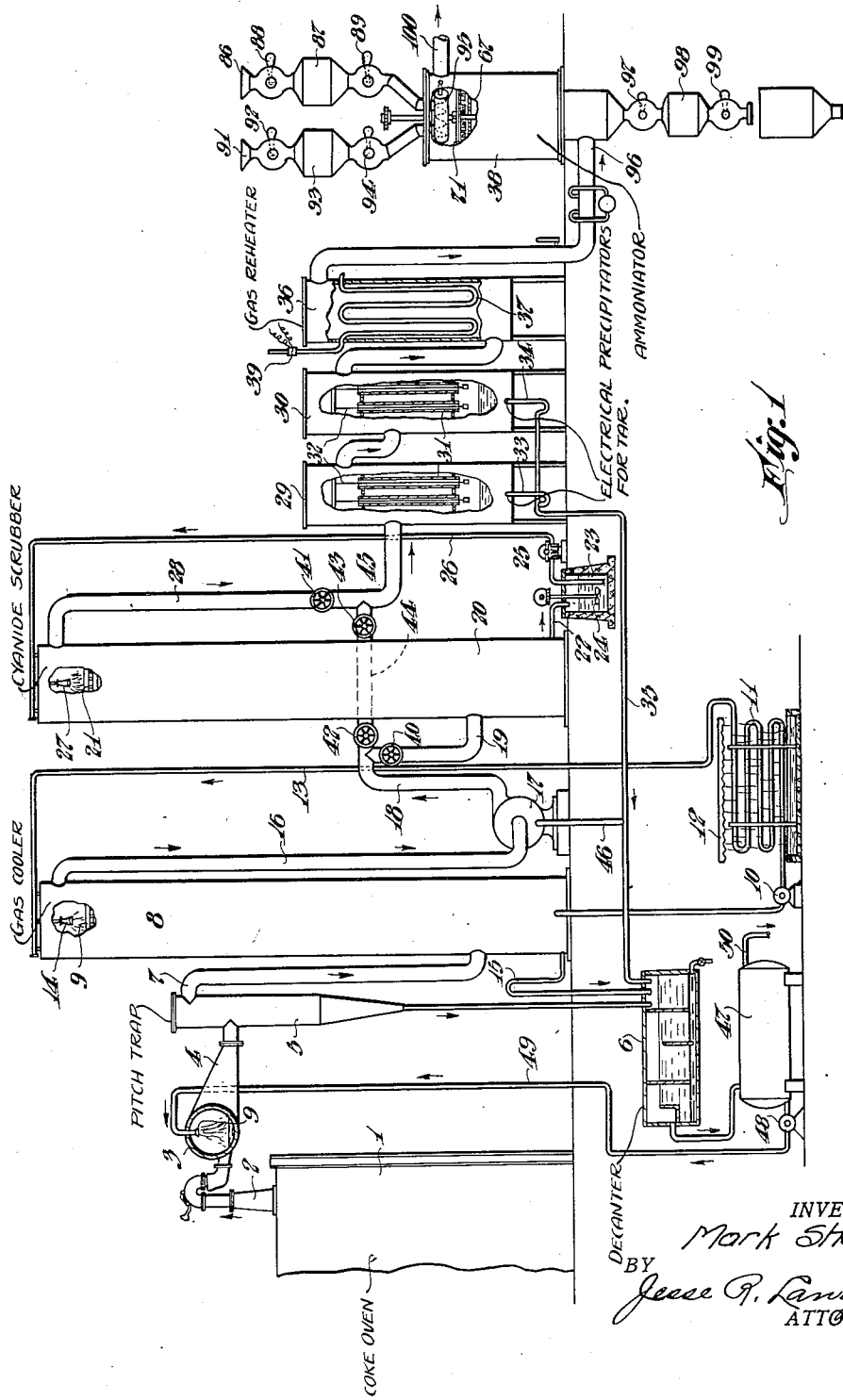

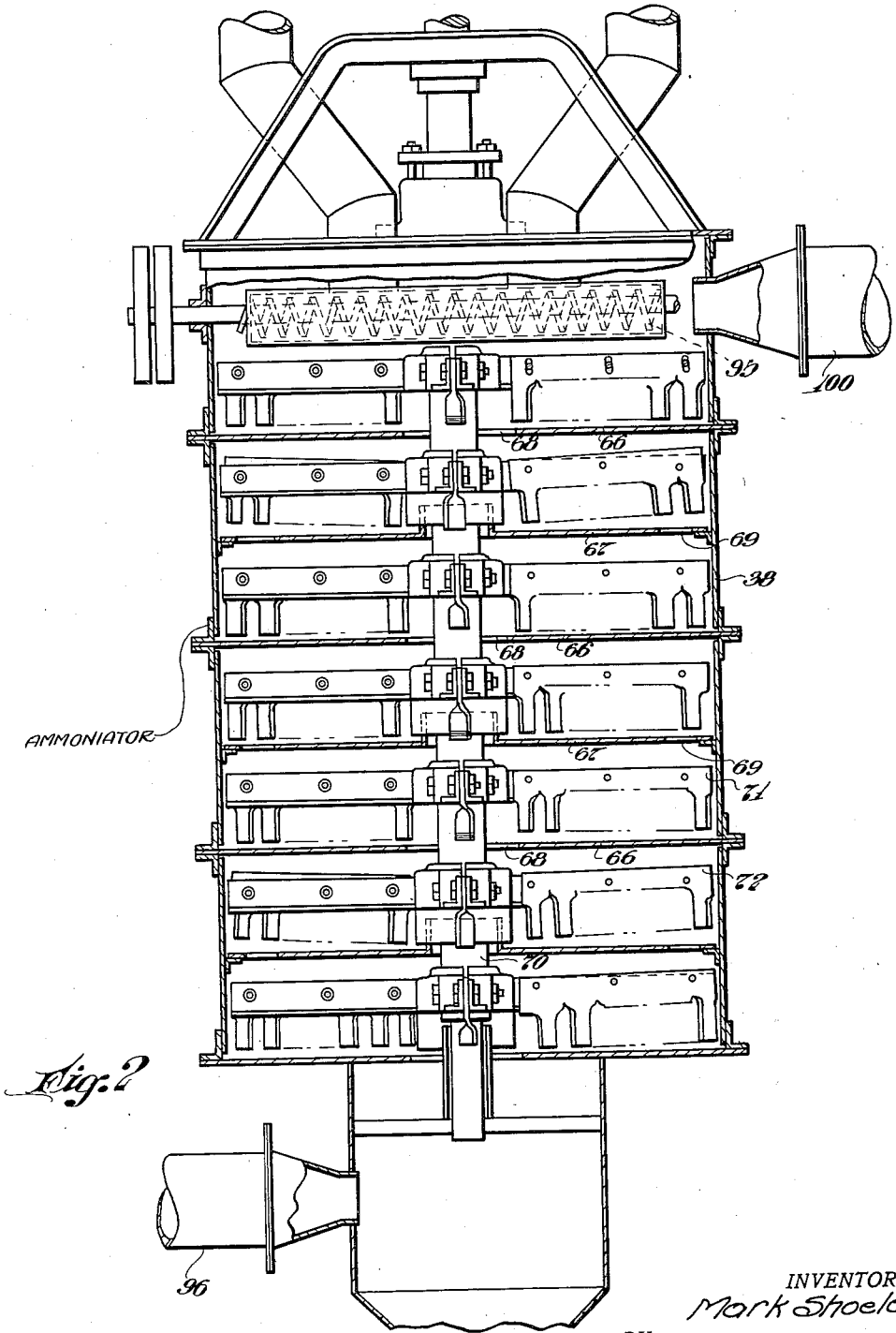

1,980,006

UNITED STATES PATENT OFFICE 1,980,006

METHOD OF RECOVERING AMMONIA FROM GAS BY CONTACT WITH ACID PHOSPHATE

Mark Shoeld, Mount Lebanon Township, Allegheny County, Pa., assignor to The Koppers Company of Delaware, a corporation of Delaware Application October 14, 1931, Serial No. 568,653

1 Claim. (Cl. 23—196)

This invention relates to method and apparatus for contacting more or less finely divided solid material with gaseous medium, preferably for the purpose of treating the solid material with the gaseous medium.

It is an object of the invention to provide a gas and solid contact apparatus which is simple and inexpensive in construction, efficient in operation, convenient in use, easy to control, and otherwise well adapted for the purposes set forth.

Examples of the uses of gas and solid contact to which the invention is adapted are the dehydration of gas by means of silica gel or alumina gel, and the removal of H2S from fuel gases by means of iron oxide.

While the invention has general application to treatment of this character, it is of particular advantage in connection with the contacting of calcium superphosphate in more or less finely divided form with coke oven gas, for the purposes of removing ammonia from the gas, and/or ammoniating the superphosphate to render the same more valuable for agricultural purposes as a fertilizer. This treatment eliminates the necessity of using sulphuric acid in a coke plant or gas works, and furnishes a neutral fertilizer with a minimum sulphur content and homogeneous ammonia distribution.

If the gas is passed through stationary layers of superphosphate, the portions of the layers first subjected to ammonia absorb an excess thereof, resulting in reversion to insoluble P2O5, while other portions are insufficiently ammoniated, unless the layers are so thin as to render the process utterly impracticable.

It is therefore a further object of the present invention to provide method and apparatus particularly suitable for contacting of calcium superphosphate with coke-oven gas, which will result in uniform reaction of the materials, limit the time period of contacting to produce an optimum ammonia content, preferably in the neighborhood of 4 or 5 percent, and prevent excessive contact and consequent reversion of P2O5 to insoluble form.

Other objects and features of novelty will be apparent as the following description proceeds, reference being had to the accompanying drawings, in which Figure 1 is an elevational view, partially in cross-section, of apparatus employed in connection with the present process in a preferred arrangement; and Fig. 2 is an elevational view, largely in cross-section, of one form of contact apparatus for gases and superphosphate material.

Referring to Fig. 1, gases and vapors from a coke-oven 1 pass through standpipe 2 into a collecting main 3 and thence through a suction main 4 into a pitch trap 5. A part of the tar, moisture and ammonia is deposited in the collecting main, suction main and pitch trap and runs from these into the decanter tank 6. The gas passes from the pitch trap 5 through a pipe 7 into the cooler 8.

This cooler is of the so-called direct-contact type and is filled with hurdles 9, over which cooled ammonia liquor is continuously recirculated. This liquor is pumped from the bottom of the cooler 8 by a pump 10 through cooling coils 11, over which water is distributed from the trough 12.

The cooled liquor passes up through a pipe 13 and is distributed by means of sprays 14 at the top of the tower 8. This cooled liquor contains additional moisture and ammonia from the gas, together with some additional tar, and the excess liquor flows through a pipe 15 into the tank 6.

The gas leaving the cooler 8 passes through a pipe 16 to a exhauster 17, and thence through pipes 18 and 19 into the bottom of a cyanide scrubber 20, the interior of which is provided with hurdles 21 over which a suspension of sulphur in ammonia liquor is continuously pumped.

In the reactions between the sulphur, ammonia, hydrogen sulphide and hydrogen cyanide in the gas and solution, the hydrogen cyanide is converted into ammonium thiocyanate, which runs out through the bottom of the scrubber through a pipe 22 into a circulating tank 23. The circulating tank is equipped with an agitator 24 for maintaining the sulphur in suspension.

The sulphur suspension is pumped by a pump 25 through a pipe 26 to sprays 27 at the top of the scrubber 20. Additional sulphur is added to take the place of that used up in the reaction, and this sulphur is advantageously used in the form of finely divided flotation sulphur recovered in gas purification processes.

The gas leaving the scrubber 20 passes through a pipe 28 into apparatus for extracting tar. It has been found advantageous to use a Cottrell electrical precipitator, and it is preferred to use two of these in series as it is of the utmost importance that substantially all of the tar and mechanically entrained moisture be removed.

Two Cottrell precipitators 29 and 30 are shown in the drawings, and are of a conventional type having a plurality of tubes 31 up which the gas passes in contact with electrodes 32. The precipitated materials are led through outlets 33 and 34 to a pipe 35 which is connected to the tank 6.

The gas passes from the precipitator 30 into a heater 36, which is a simple steel tower containing steam coils 37 with provision for the automatic and exact regulation of the temperature of the gas which is about to be passed into the ammoniator 38 wherein the ammonia is absorbed by superphosphate. A thermostatically controlled valve 39 may be placed in the steam line whereby the temperature of the heater 36 may be regulated.

Instead of the heater 36, other simple heating means, such as steam coils within or just outside the gas piping and the ammoniator, may be substituted. Also, under certain conditions with proper regulation of the cooler 8, the heater 36 may be omitted.

The simple system described above for the removal of hydrocyanic acid is very effective in preventing any cyanide compounds from being carried along with the gas and contaminating the ammoniated superphosphate, but, of course, a variety of other hydrocyanic acid removal systems may be substituted.

However, it has been found that with suitable arrangements for controlling the temperature of the gas so as to prevent any condensation in the ammoniation apparatus, and with suitable precautions for presenting any ammonia liquor spray from being carried along with the gas into the ammoniation apparatus, the removal of hydrocyanic acid by a special scrubber in this system is unnecessary.

If any hydrogen cyanide is present in the gas it is preferable to operate the plant with a minimum percentage of oxygen, namely, below about 0.5 per cent.

As stated above, the hydrocyanic acid scrubber is not absolutely necessary when suitable precautions are taken in modern coke-oven plants, and it may be dispensed with or by-passed by closing valves 40 and 41, opening valves 42 and 43, and causing the gas to pass from the pipe 18 through pipes 44 and 45 into the precipitator 29.

The preferred order of arrangement of the exhauster 17, the scrubber 20 and the precipitators 29 and 30 is that shown in the drawing. However, the positions of these units may be interchanged as desired. For instance, the scrubber 20 may be placed before the exhauster 17 with the preciptators 29 and 30 coming after the exhauster, or the precipitators 29 and 30 may be placed before the exhauster, and the scrubber 20 after the exhauster.

The exhauster 17 which may be of the centrifugal type, as shown, is operated as is usual in the by-product coke-oven art to maintain a constant and uniform pressure in the collecting main. Tar from the exhauster may be drained out through a pipe 46 which is connected to the pipe 35 leading to the tank 6.

Ammonia liquor in the tank 6 overflows into a tank 47 from which it may be purified for flushing purposes into the collecting main 3 by means of a pump 48 through a pipe 49, or liquor from the tank 47 may be passed through a pipe 50 for other disposition.

As shown in Fig. 2, the ammoniator 38 comprises preferably a cylindrical chamber having therein a series of evenly spaced superposed horizontal trays. Two types of trays are used, as, for instance, 66 and 67, arranged alternately, trays 66 having openings 68 in the center, and trays 67 having openings 69 adjacent to the wall of the ammoniator 38. A shaft 70 is mounted vertically in the center of the ammoniator for rotating the rabble arms 71 and 72 which are designed to push material either toward the center or toward the sides of the ammoniating chamber.

For instance, the rabble arms mounted above the trays 66 are so designed that upon rotation of the shaft, the blades push the superphosphate material toward the openings 68, whereupon the material drops to the trays 67, and the rabble arms above these trays 67 have blades which push the material toward the openings 69.

An important factor in the optimum ammoniation of superphosphate is the relative area of material exposed on the trays in comparison to the gas space above the trays. This ratio is preferably three square feet of solids to one cubic foot of gas space, but may be varied from one to three square feet of material per cubic foot of gas space.

Another important factor is the continual stirring of the solid material, whereby new surfaces are exposed to the gas stream. This stirring is of more or less gentle nature, so that the material is not unduly broken up during the treatment.

The amount of solid material that may be maintained in the machine is predetermined, and depends upon the rabble setting used. This means that the time factor of the solids in the machine can be adjusted to suit any particular condition.

The superphosphate material is fed into a hopper 86 and is permitted to drop into the chamber 87 by opening a valve 88. When the chamber 87 is filled, the valve 89 is opened to permit the passage of the superphosphate into the ammoniating chamber 38. Access to the chamber 87 is controlled by the valves 88 and 89 to prevent the escape of gases from the ammoniating chamber while the latter is being charged.

Two devices for forwarding material into the chamber 38 may be provided as shown, so that one may be filled while the other one is being emptied. Accordingly there is provided a second hopper 91 from which the material passes through a valve 92, a chamber 93 and a valve 94 having the same mode of operation and of the same construction respectively as valve 88, chamber 87 and valve 89.

The phosphate material is dropped into a screw conveyor 95, from whence it is dropped onto the uppermost tray 67, and is zigzagged downwardly through the chamber while the layers of material on the trays are maintained in continuous agitation. The gases entering the ammoniator at the bottom through an inlet pipe 96 are passed upwardly countercurrent to the material treated.

At the end of the desired period, the ammoniated product is immediately passed out of contact with the gases through the valve 97 and into a chamber 98 from which it may be removed through a valve 99. The valve 97 is ordinarily kept open except when the valve 99 is opened. When removing material from the chamber 98, the valve 97 is closed. The gases leave the ammoniator through a pipe 100.

As the regulation of the temperature in the ammoniator is very important, the heater 36, the ammoniator 38 and all connecting piping, should be effectively insulated. All precautions should be taken to prevent condensation of moisture which might be mechanically carried through the heater and which might enter the ammoniator in the form of spray, thus risking some contamination with ammonium thiocyanate.

It is preferable to adjust the heater 36 so that the gas will enter the ammoniator at a temperature of about 40° C. It is also important to regulate the operation of the cooler 8 so that the gas entering the ammoniator will carry at least 5° of superheat to remove the moisture produced in the ammoniation and to obviate any possibility of condensing moisture in the ammoniator. Allowance should, of course, be made for the pressure of the gas entering the ammoniator and for the heat of compression produced by the exhauster.

For example, with a gauge pressure of two pounds per square inch after the exhauster, and with a temperature of about 40° C. in the pipe leading to the ammoniator 38, the gas should be cooled in the cooler 8 to about 30° C. If the temperature of the cooling water is high, then the temperature of the gas from the cooler will be high, but the temperature of the gas entering the ammoniator should not exceed about 50° C. and under extreme conditions, some artificial cooling may be necessary in connection with the operation of the cooler 8. However, if the temperature of the gas from the cooler is below 30° C., it may be heated up to at least this latter temperature.

On the other hand, conditions should be adjusted so that the gas entering the ammoniator is not too cool. 40° C. is the preferred temperature, and this should preferably not be permitted to go below 30° C., otherwise the capacity of the ammoniator is seriously reduced and there is danger of loss of ammonia in the exit gases. In certain cases the superphosphate may be heated before entering the ammoniator.

The rate of feed of superphosphate into the ammoniator should be adjusted to correspond with the ammonia content of the gas, and the rate of flow of the gas, and so as to maintain a uniform ammonia content in the ammoniated superphosphate withdrawn from the bottom tray. With uniform operation of the coke ovens and the condensing system, the ammonia content of the gas is quite uniform. However, the rate of flow of the gas is usually subject to fluctuations. Hence, automatic arrangements may be provided to adjust the rate of feed of the superphosphate and the rate of movement of the rabble arms in the ammoniator. In this manner a uniform ratio of the flow of superphosphate to the flow of gas is always maintained.

The percentage of ammonia in the ammoniated product should not ordinarily exceed 5%, and 4% is the usual figure. The percentage of insoluble $P_2O_5$ in the ammoniated product depends upon that present in the original superphosphate but the increase in the ammoniation operation should not exceed 1.5%. This product will be free from ammonium thiocyanate and other toxic substances.

It may be readily seen that the operation of the ammoniator is such as to withdraw the ammoniated product from the action of the ammonia gas as soon as this product has attained the desired percentage of ammonia. This, as has been previously stated, is one of the conditions essential to preventing high reversion.

The ammoniated superphosphate has somewhat the same physical properties as the original superphosphate, before ammoniation. A large percentage of the material comprises spheroidal particles of dense structure and uniformly porous. 100% of the material passes through a six-mesh screen and less than 5% through a 100-mesh screen.

The ammoniated superphosphate contains about 4% to 5% of ammonia and approximately 16% $P_2O_5$, with total insoluble $P_2O_5$ of about 2 to 2½%. As stated above, it contains less than about 1.5% of reverted phosphate material. Furthermore, the ammoniated product is a free flowing non-caking material owing partly to the presence of a large percentage of the peculiar porous ball-like particles.

It is to be noted that very little dust is produced in the ammoniator and that merely the simplest type of dust catcher, if any, is to be used, will suffice as a precautionary measure, or else the gas leaving the ammoniator may be caused to pass directly into the usual liquid purification system, the amount of dust being insufficient to cause any appreciable loss of value or any trouble in the purification operations.

By the use of the above-described apparatus and method in the removal of ammonia, there is a saving in the cost of acid and by discarding the usual type of saturator, the operation is clean and the fertilizer product is of a superior mechanical condition. The apparatus is simple and may be made of steel since there is no corrosion when operated under the conditions set forth. This eliminates the need for expensive lining materials ordinarily used when using acids. Furthermore, there is a considerable power saving, owing to a very low back pressure of about three to six inches as compared with a back pressure of thirty to forty inches when an acid saturator is used.

Various superphosphate material, including good den superphosphates and others, may be employed in the present process and apparatus. Very satisfactory results are obtained with a superphosphate material prepared and employed as set forth in a copending application of F. W. Sperr, Jr., Serial No. 505,091, filed December 27, 1930.

Ammonia-containing gases from various sources may be employed. Coal gas treated as set forth and in the manner described in a copending application of F. W. Sperr, Jr., Serial No. 505,090, filed December 27, 1930, for the removal of ammonia from gas by means of superphosphate material is very satisfactorily adapted to the ammoniation of the material treated in the present process.

The rabble teeth of the ammoniator are preferably constructed and arranged as disclosed in my copending application, Serial No. 555,494, filed August 6, 1931.

The invention as hereinbefore set forth is embodied in a particular form but may be variously embodied within the scope of the claim hereinafter made.

I claim as my invention:

The method of recovering ammonia from coal gas with solid superphosphatic material as ammoniated superphosphate which comprises: flowing coal gas containing ammonia along and in surface contact with the surface of a countercurrent flowing bed containing the proportionate quantity of solid superphosphatic material required to produce a uniform 4–5% ammoniated product with the total quantity of ammonia in a predetermined volume of said coal gas; effecting such counterflow and surface contact by maintaining said bed in successive superposed moving layers moving with constant agitation of the layers to bring lower portions thereof to the surface and with gradual and continual discharge of the solid phosphatic material from layer to layer of the bed, and by flowing the coal gas through substantially free gas-spaces over but not through the layers and in surface contact with only the upper surfaces of the layers in succession in opposite direction to the flow of the respective layers during their flow and agitation as aforesaid; and thereby recovering the ammonia from said coal gas and ammoniating said phosphatic material; regulating and controlling the quantity of fresh phosphate supplied to and ammoniated phosphate discharged from the bed and the rate of movement thereof in accordance with the ammonia content and rate of flow of the aforesaid predetermined volumes of coal gas along the surface of said bed, to maintain the proportion of said solid material to the volumes of coal gas aforesaid; and maintaining a ratio of from one to three square feet of said solid material to each cubic foot of gas space through which the gas flows as aforesaid for contact therewith; and thereby substantially completely removing the ammonia from the coal gas with simultaneous recovery of a uniform 4-5% ammoniated phosphatic product.

MARK SHOELD.